United States Patent [19]
Yamana et al.

[11] Patent Number: 6,013,732
[45] Date of Patent: Jan. 11, 2000

[54] STAINPROOFING AGENT

[75] Inventors: Masayuki Yamana; Ikuo Yamamoto; Teruyuki Fukuda, all of Osaka, Japan

[73] Assignee: Daikin Industries Ltd., Osaka-fu, Japan

[21] Appl. No.: 09/008,484

[22] Filed: Jan. 16, 1998

[30] Foreign Application Priority Data

Jan. 16, 1997 [JP] Japan ..................... 9-005358

[51] Int. Cl.[7] .................................. D06M 15/00
[52] U.S. Cl. .................. 525/123; 525/185; 525/190; 525/199; 525/221; 525/232; 525/233; 525/234; 525/235; 525/238; 252/8.81; 8/115.6; 428/96
[58] Field of Search ..................... 525/123, 185, 525/190, 199, 221, 222, 232, 233, 234, 235, 238, 239, 240; 252/8.81; 8/115.6; 428/96

[56] References Cited

U.S. PATENT DOCUMENTS

| 4,264,484 | 4/1981 | Patel . |
| 4,295,976 | 10/1981 | Dessaint et al. ............ 252/8.9 |
| 5,548,022 | 8/1996 | Ito et al. .................. 524/839 |

FOREIGN PATENT DOCUMENTS

| 58-59277 | 4/1983 | Japan . |
| 63-17109 | 4/1988 | Japan . |
| 355515 | 8/1991 | Japan . |
| 355516 | 8/1991 | Japan . |
| 128147 | 6/1998 | Japan . |
| 2043090 | 10/1980 | United Kingdom . |

*Primary Examiner*—Nathan M. Nutter
*Attorney, Agent, or Firm*—Birch, Stewart, Kolasch & Birch, LLP

[57] ABSTRACT

The present invention provides a stainproofing agent having the durability capable of maintaining sufficient water- and oil-repellency as well as stainproofing properties before and after cleaning. Disclosed is a stainproofing agent containing (A) a fluroalkyl group-containg copolymer having (I) a structure unit derived from a monomer having a fluoroalkyl group, (II) a structure unit derived from a monomer containing no fluorine, (III) a structure unit derived from vinyl chloride, and (IV) a structure unit derived from a crosslinking monomer; (B) a urethane compound having a fluoroalkyl group, or a copolymer having (V) a structure unit derived from a monomer having a fluoroalkyl group and a carbon-carbon double bond, and (VI) a structure unit derived from a monomer which contains no fluorine atom and has at least one urethane or urea linkage and one carbon-carbon double bond; and (C) an acrylic copolymer containing no fluorine.

27 Claims, No Drawings

STAINPROOFING AGENT

FIELD OF THE INVENTION

The present invention relates to a stainproof treatment agent. More particularly, the present invention relates to a stainproofing agent comprising a specific copolymer having a fluoroalkyl group and a specific blender copolymer. The stainproofing agent of the present invention is particularly useful for a carpet.

RELATED ART

In order to impart the water repellency, oil repellency and stainproofing properties to a textile (e.g. carpet), various stainproofing agents have hitherto been suggested. Japanese Patent Kokoku Publication Nos. 17109/1988, 55515/1991 and 55516/1991 disclose that a stainproofing agent comprising an urethane compound and a specific blender copolymer imparts the water repellency, oil repellency and stainproofing properties. However, the water repellency, oil repellency and stainproofing properties after cleaning are insufficient according to these copolymers.

Japanese Patent Kokai Publication No. 59277/1983 also discloses a water- and oil-repellent comprising a copolymer containing vinyl chloride, and the water repellency and oil repellency before and after cleaning are almost the same but the stainproofing properties are insufficient.

Japanese Patent Kokoku Publication No. 28147/1989 discloses a composition for treating a carpet, comprising an adipate ester (low molecular weight) and a blender. However, this composition can not impart sufficient water repellency, oil repellency and stainproofing properties after cleaning.

None of stainproofing agents, which have hitherto been suggested, has sufficient water- and oil-repellency as well as stainproofing properties before and after cleaning.

SUMMARY OF THE INVENTION

An object of the present invention is to provide a stainproofing agent having durability capable of maintaining sufficient water- and oil-repellency and stainproofing properties after cleaning.

The present invention provides a stainproofing agent comprising:

(A) a fluoroalkyl group-containing copolymer comprising
  (I) a structure unit derived from a monomer having a fluoroalkyl group,
  (II) a structure unit derived from a monomer containing no fluorine,
  (III) a structure unit derived from vinyl chloride, and
  (IV) a structure unit derived from a crosslinking monomer;

(B) an urethane compound having a fluoroalkyl group, or a copolymer having:
  (V) a structure unit derived from a monomer having a fluoroalkyl group, and
  (VI) a structure unit derived from a monomer which contains no fluorine atom and has at least one urethane or urea linkage and one carbon-carbon double bond; and (C) an acrylic copolymer containing no fluorine.

The present invention also provides a stainproofing agent comprising the above copolymer (B) and copolymer (C).

DETAILED DESCRIPTION OF THE INVENTION

The fluoroalkyl group is preferably a perfluoroalkyl group. The structure unit (I) is preferably a structure unit derived from (meth)acrylate ester having a fluoroalkyl group. The monomer constituting the structure unit (I) is preferably one represented by the general formula (1):

$$Rf-R^1-OCOC(R^2)=CH_2$$

wherein Rf is a linear or branched fluoroalkyl group having 3 to 20 carbon atoms;

$R^1$ is a linear or branched alkylene group having 1 to 20 carbon atoms, a group of $-SO_2N(R^3)R^4-$ or a group of $-CH_2CH(OR^5)CH_2-$ ($R^3$ is an alkyl group having 1 to 10 carbon atoms; $R^4$ is a linear or branched alkylene group having 1 to 10 carbon atoms; and $R^5$ is a hydrogen atom or an acyl group having 1 to 10 carbon atoms); and $R^2$ is a hydrogen atom or a methyl group.

Examples of the monomer include the following, but are not limited thereto.

$CF_3(CF_2)_7(CH_2)_{10}OCOCH=CH_2$
$CF_3(CF_2)_7(CH_2)_{10}OCOC(CH_3)=CH_2$
$CF_3(CF_2)_6CH_2OCOCH=CH_2$
$CF_3(CF_2)_8CH_2OCOC(CH_3)=CH_2$
$(CF_3)_2CF(CF_2)_6(CH_2)_2OCOCH=CH_2$
$(CF_3)_2CF(CF_2)_8(CH_2)_2OCOCH=CH_2$
$(CF_3)_2CF(CF_2)_{10}(CH_2)_2OCOCH=CH_2$
$(CF_3)_2CF(CF_2)_6(CH_2)_2OCOC(CH_3)=CH_2$
$(CF_3)_2CF(CF_2)_8(CH_2)_2OCOC(CH_3)=CH_2$
$(CF_3)_2CF(CF_2)_{10}(CH_2)_2OCOC(CH_3)=CH_2$
$CF_3CF_2(CF_2)_6(CH_2)_2OCOCH=CH_2$
$CF_3CF_2(CF_2)_8(CH_2)_2OCOCH=CH_2$
$CF_3CF_2(CF_2)_{10}(CH_2)_2OCOCH=CH_2$
$CF_3CF_2(CF_2)_6(CH_2)_2OCOC(CH_3)=CH_2$
$CF_3CF_2(CF_2)_8(CH_2)_2OCOC(CH_3)=CH_2$
$CF_3CF_2(CF_2)_{10}(CH_2)_2OCOC(CH_3)=CH_2$
$CF_3(CF_2)_7SO_2N(CH_3)(CH_2)_2OCOCH=CH_2$
$CF_3(CF_2)_7SO_2N(C_2H_5)(CH_2)_2OCOCH=CH_2$
$(CF_3)_2CF(CF_2)_8CH_2CH(OCOCH_3)CH_2OCOC(CH_3)=CH_2$
$(CF_3)_2CF(CF_2)_6CH_2CH(OH)CH_2OCOCH=CH_2$

The structure unit (II) is preferably derived from a vinyl monomer containing no fluorine. Examples of the preferable monomer constituting the structure unit (II) include ethylene, vinyl acetate, vinylidene halide, acrylonitrile, styrene, alkyl (meth)acrylate, polyethylene glycol (meth)acrylate, polypropylene glycol (meth)acrylate, methoxypolyethylene glycol (meth)acrylate, methoxypolypropylene glycol (meth)acrylate, vinyl alkyl ether and isoprene, but are not limited thereto.

The monomer constituting the structure unit (II) may be (meth)acrylate ester having an alkyl group. The number of carbon atoms of the alkyl group may be from 1 to 30, e.g. from 6 to 30, specifically from 10 to 30. For example, the monomer constituting the structure unit (II) may be acrylates represented by the general formula:

$$CH_2=CB^1COOB^2$$

wherein $B^1$ is a hydrogen atom or a methyl group; and $B^2$ is an alkylene group represented by $C_nH_{2n+1}$ (n=1–30). By copolymerizing these monomers, the water- and oil-repellency and stainproofing properties as well as various characteristics (e.g. cleaning resistance, washing resistance and wear resistance of these properties, solubility in solvent, hardness and feeling) can be improved.

The crosslinking monomer constituting the structure unit (IV) may be a vinyl monomer which has at least two reactive groups but contains no fluorine. The crosslinking monomer may be a compound having at least two carbon-carbon double bonds, or a compound having at least one carbon-carbon double bond and at least one reactive group.

Examples of the crosslinking monomer include diacetone acrylamide, (meth)acrylamide, N-methylol acrylamide, hydroxymethyl (meth)acrylate, hydroxyethyl (meth)acrylate, 3-chloro-2-hydroxypropyl (meth)acrylate, N,N-dimethylaminoethyl (meth)acrylate, N,N-diethylaminoethyl (meth)acrylate, butadiene, chloroprene, glycidyl (meth)acrylate, 2-methacryloyloxyethyl succinate, acrylate and methacryate, but are not limited thereto. By copolymerizing these monomers, the water- and oil-repellency and stain-proofing properties as well as various characteristics (e.g. cleaning resistance, washing resistance and wear resistance of these properties, solubility in solvent, hardness and feeling) can be improved.

The weight-average molecular weight of the copolymer (A) is preferably from 2,000 to 1,000,000.

The amount of the structure unit (I) is preferably from 40 to 90% by weight, more preferably from 50 to 80% by weight; the amount of the structure unit (II) is preferably from 5 to 60% by weight, more preferably from 10 to 40% by weight; the amount of the structure unit (III) is preferably from 5 to 50% by weight, more preferably from 10 to 40% by weight; and the amount of the structure unit (IV) is preferably from 0.1 to 10% by weight, more preferably from 0.5 to 5% by weight; based on the copolymer (A).

The copolymer (B) is; a urethane compound or copolymer having a fluoroalkyl group. The copolymer (B) having a fluoroalkyl group is a copolymer having (V) a structure unit derived from a monomer having a fluoroalkyl group and a carbon-carbon double bond and (VI) a structure unit derived from a monomer having no fluorine atom, at least one urethane or urea linkage and one carbon-carbon double bond.

The urethane compound (B) having a fluoroalkyl group is preferably a urethane compound represented by the general formula:

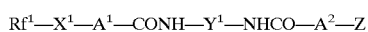

wherein $Rf^1$ is a fluoroalkyl group having 4 to 16 carbon atoms; $X^1$ is $—R^1—$, $—CON(R^2)—Q^1—$, or $—SO_2N(R^2)—Q^1—$ ($R^1$ is an alkylene (for example, $C_1$–$C_{20}$) group; $R^2$ is a hydrogen atom or a lower (for example, $C_1$–$C_{10}$) alkyl group; $Q^1$ is an alkylene (for example, $C_1$–$C_{20}$) group); $A^1$ and $A^2$ are respectively $—O—$, $—S—$ or $—N(R^2)—$ ($R^2$ is a hydrogen atom or a lower (for example, $C_1$–$C_{10}$) alkyl group); $y^1$ is a residue wherein isocyanate is removed from an aromatic or alicyclic diisocyanate; and Z is an alkyl (for example, $C_1$–$C_{20}$) group, an aryl (for example, $C_6$–$C_{20}$) group or $—X^1—Rf^1$, or a urethane compound represented by the general formula:

wherein $Rf^2$ is a fluoroalkyl group having 4 to 16 carbon atoms and $X^2$ is $—R^1—$, $—CON(R^2)—Q^1—$ or $—SO_2N(R^2)—Q^1—$ ($R^1$ is an alkylene (for example, $C_1$–$C_{20}$) group; $R^2$ is a hydrogen atom or a lower (for example, $C_1$–$C_{10}$) alkyl group; $Q^1$ is an alkylene (for example, $C_1$–$C_{20}$) group); $A^3$ is $—O—$, $—S—$ or $—N(R^3)—$ ($R^3$ is a hydrogen atom or a lower (for example, $C_1$–$C_{10}$) alkyl group); $y^2$ is a residue wherein isocyanate is removed from an aromatic or alicyclic diisocyanate; and W is a hydrophilic group.

Specific examples of the structure unit (V) in the copolymer (B) are the same as those of the above structure unit (I).

The monomer (VI) having no fluorine atom, at least one urethane or urea linkage and one carbon-carbon double bond can be obtained by reacting:

(a) a compound having at least two isocyanate groups,
(b) a compound having one carbon-carbon double bond and at least one hydroxyl or amino group, and
(c) a compound having one hydroxyl or amino group.

Examples of the compound (a) are as follows.

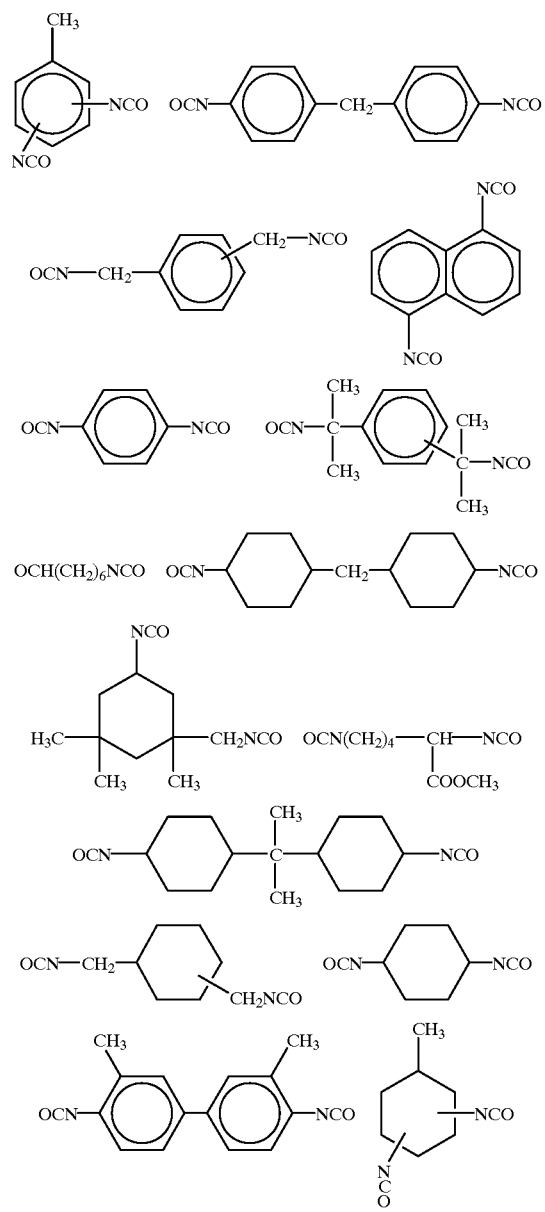

The compound (a) is preferably diisocyanate. However, triisocyanate and polyisocyanate having at least four isocyanate groups can also be used in the reaction.

For example, a trimer of diisocyanate, polymeric MDI (diphenylmethane diisocyanate) and, furthermore, an adduct between a polyhydric alcohol (e.g. trimethylolpropane, trimethylolethane and glycerin) and diisocyanate can also be used in the reaction.

Examples of triisocyanate and polyisocyanate are as follows.

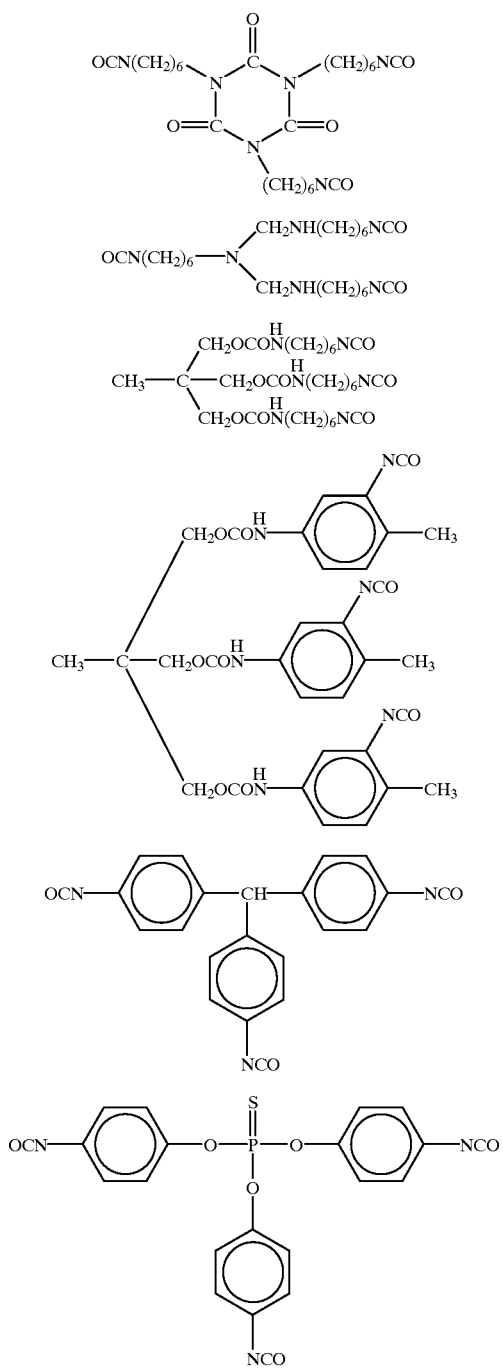
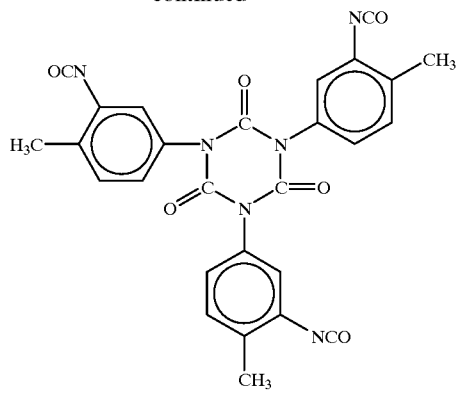
The compound (b) may be, for example, a compound represented by the following formulas:
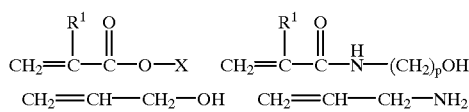
wherein $R^1$ is a hydrogen atom or a methyl group; p is from 0 to 300 (for example, 1 to 20); and X is as follows:
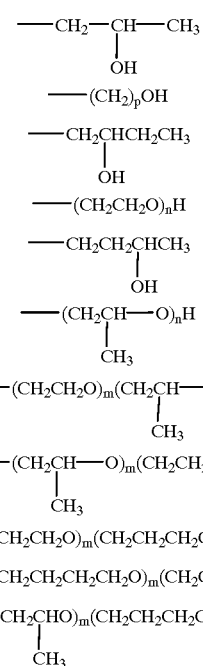
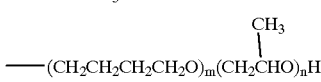
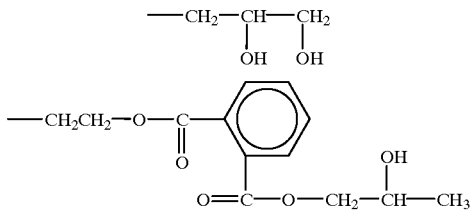

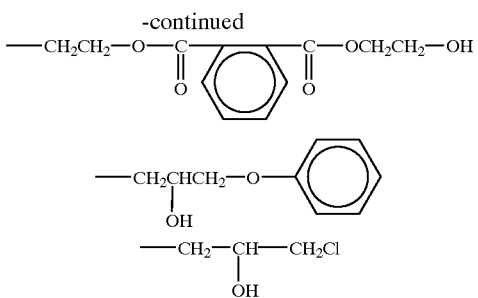

wherein p, m and n are respectively a number of 1 to 300.

The compound (c) may be a compound represented by the formula:

$R^2$—OH, $R^2$—NH$_2$ or $R^2$—NH—$R^3$ wherein $R^2$ and $R^3$ are the same or different and may contain a hetero atom, and are respectively a $C_1$–$C_{22}$ alkyl group or an aromatic or alicyclic group (preferably having 6 to 30 carbon atoms). Preferable groups of $R^2$ and $R^3$ are $C_8H_{17}$, $C_7H_{35}$, $C_4H_9$ and cyclohexyl.

Examples of the compound (c) are butyl alcohol, 2-ethylhexyl alcohol, lauryl alcohol, stearyl alcohol, oleyl alcohol, benzyl alcohol, cyclohexyl alcohol, 2-ethylhexylamine and sterylamine.

The compounds (a), (b) and (c) may be reacted in a molar ratio of 1:1:1, when the compound (a) is diisocyanate, or 1:1:2 when the compound (a) is triisocyanate.

In the copolymer (B), a weight ratio of the monomer (V) to the monomer (VI) is from 5:95 to 95:5, preferably from 20:80 to 95:5. The weight-average molecular weight of the copolymer (B) may be from 500 to 1,000,000.

The copolymer (C) comprises at least two (meth)acrylic monomers containing no fluorine. The (meth)acrylic monomer containing no fluorine is preferably represented by the general formula:

$CH_2$=$CX^1$ $COOX^2$ wherein $X^1$ is a hydrogen atom or a methyl group; and $X^2$ is a linear or branched $C_nH_{2n+}$ group (n=1–5).

The copolymer (C) may be methyl methacrylate (MMA)/ethyl methacrylate (EMA) copolymer.

The weight-average molecular weight of the copolymer (C) is preferably from 1,000 to 1,000,000. More preferably, it is from 100,000 to 200,000.

The amount of methyl methacrylate (MMA) is preferably from 40 to 95% by weight, more preferably from 75 to 85%, and the amount of ethyl methacrylate (EMA) is preferably from 5 to 60% by weight, more preferably from 15 to 25%, based on the copolymer (B) which is the MMA/EMA copolymer.

The stainproofing agent preferably contains 0 to 99 parts by weight of the copolymer (A), 0.1 to 99 parts by weight of the component (B) and 0.1 to 99 parts by weight of the copolymer (C).

The copolymers (A) and (C) in the present invention can be normally produced by any polymerization method, and the conditions of the polymerization reaction can also be optionally selected. Examples of the polymerization method include a solution polymerization and an emulsion polymerization. Among them, the emulsion polymerization is particularly preferable.

The method for production of the copolymer (A) will be described in detail.

In the solution polymerization, there can be used a method of dissolving the monomer (I), monomer (II) and crosslinking monomer (IV) in an organic solvent in the presence of a polymerization initiator, charging vinyl chloride (III) after substitution with nitrogen, and heating the mixture with stirring at the temperature within the range from 50 to 120° C. for 1 to 10 hours. Examples of the polymerization initiator include azobisisobutyronitrile, benzoyl peroxide, di-t-butyl peroxide, lauryl peroixde, cumene hydroperoxide, t-butyl peroxypivalate, and diisopropyl peroxydicarbonate. The polymerization initiator can be used in the amount within the range from 0.01 to 5 parts by weight based on 100 parts by weight of the monomers (I) to (IV).

The organic solvent is inert to the monomers (I) to (IV) and dissolves them. Examples of the organic solvent include pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent can be used in the amount within the range from 50 to 1,000 parts by weight based on 100 parts by weight of total amount of the monomers (I) to (IV).

In the emulsion polymerization, there can be used a method of emulsifying the monomer (I) monomer (II) and crosslinking monomer (IV) in water in the presence of a polymerization initiator and an emulsifying agent, charging vinyl chloride (III) after substitution with nitrogen, and copolymerizing with stirring at the temperature within the range from 50 to 80° C. for 1 to 10 hours. As the polymerization initiator, for example, water-soluble initiators (e.g. benzoyl peroxide, lauroyl peroxide, t-butyl perbenzoate, 1-hydroxycyclohexyl hydroperoxide, 3-carboxylpropionyl peroxide, acetyl peroxide, azobisisobutylamidine dihydrochloride, azobisisobutyronitrile, sodium peroxide, potassium persulfate and ammonium persulfate) and oil-soluble initiators (e.g. azobisisobutyronitrile, benzoyl peroxide, di-t-butyl peroxide, lauryl peroxide, cumene hydroperoxide, t-butyl peroxypivalate and diisopropyl peroxydicarbonate) can be used. The polymerization initiator may be used in the amount within the range from 0.01 to 5 parts by weight based on 100 parts by weight of the monomers.

In order to obtain a copolymer dispersion in water, which is superior in storage stability, it is desirable that the monomers are atomized in water by using an emulsifying device capable of applying a strong shattering energy (e.g. a high-pressure homogenizer and a ultrasonic homogenizer) and then polymerized is the presence of the oil-soluble polymerization initiator. As the emulsifying agent, various emulsifying agents such as an anionic emulsifying agent, a cationic emulsifying agent and a nonionic emulsifying agent can be used in the amount within the range from 0.5 to 10 parts by weight based on 100 parts by weight of the monomers. The anionic and/or nonionic emulsifying agents are preferably used. When the monomers (I) to (IV) are not completely compatibilized, a compatibilizing agent capable of sufficiently compatibilizing them (e.g. a water-soluble organic solvent and a low-molecular weight monomer) is preferably added to these monomers. By the addition of the compatibilizing agent, the enulsifiability and copolymerizability can be improved.

Example s of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g. from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight e.g. from 10 to 40 parts by weight, based on 100 parts by weight of total amount of monomer (I) and monomer (II).

The urethane compound (V) having a fluoroalkyl group can be normally produced by the addition reaction of diisocyanate (OCN—$Y^1$—NCO), a fluorine-containing compound $Rf^1$—$X^1$—$A^1$—H (e.g. 2-perfluoroalkyl ethanol) and a compound Z—$A^2$—H (e.g. methanol) or W—H (e.g. polyoxyethylene glycol monomethyl ether).

Dispersion of the urethane compound having a fluoroalkyl group into the medium mainly comprising water can be conducted by various methods. For example, there can be used a method of stirring a mixture of an urethane compound having a fluoroalkyl group and an aqueous medium at high speed under heating and then cooling the reaction solution to room temperature, and a method of adding dropwise a water-soluble organic solvent solution of an urethane compound having a fluoroalkyl group into water under stirring or a method of adding dropwise water to the contrary.

The copolymer (B) having structure unit (V) and structure unit (VI) can be produced by the solution polymerization, the emulsion polymerization or the suspension polymerization.

The copolymers (A) and (B) in the present invention can be produced by 20 the solution polymerization in an organic solvent. Examples of the organic solvent include ketones (e.g. acetone, methyl ethyl ketone and methyl isobutyl ketone), esters (e.g. ethyl acetate, propyl acetate and butyl acetate), alcohols (e.g. ethanol, isopropanol, butanol, 1,3-butanediol and 1,5-pentanediol), halogenated hydrocarbons (e.g. perchloroethylene, Trichlene (trichloroethylene), 1,1-dichloro-2,2,3,3,3-pentafluoropropane, 1,3-dichloro- 1,2,2, 3,3,3-pentafluoropropane and 1,1-dichloro-1-fluoroethane (HCFC-141b)); hydrocarbons (such as octane, petroleum, toluene and xylene), dipropylene glycol, dipropylene glycol monomethyl ether, tripropylene glycol monomethyl ether, polypropylene glycol, triethylene glycol dimethyl ether, propylene glycol and ethylene glycol.

Preferable organic solvents are ketones (e.g. methyl ethyl ketone and methyl isobutyl ketone), ethyl acetate and 1,1-dichloro-1-fluoroethane.

The copolymers (A) and (B) can also be produced in an aqueous suspension. The monomer can be emulsion-polymerized by using water, an emulsifying agent and, if necessary, an organic solvent. The mixture may be polymerized after previously emulsifying by a high-pressure emulsifier. As the emulsifying agent, various emulsifying agents (e.g. anionic, cationic or nonionic emulsifying agents) can be used in the amount within the range from 0.5 to 10 parts by weight based on 100 parts by weight of the monomer. It is preferable to use the anionic and/or nonionic emulsifying agents.

Examples of the anionic emulsifying agent include sodium lauryl sulfate, lauryl sulfate triethanolamine, sodium polyoxyethylene lauryl ether sulfate, sodium polyoxyethylene nonylphenyl ether sulfate, polyoxyethylene lauryl ether sulfate triethanolamine, sodium cocoylsarcosine, sodium N-cocoylmethyltaurine, sodium polyoxyethylene (coconut) alkyl ether sulfate, sodium diether hexylsulfosuccinate, sodium α-olefin sulfonate, sodium lauryl phosphate, sodium polyoxyethylene lauryl ether phosphate and perfluoroalkyl carboxylate salt (manufactured by Daikin Industries Ltd., under the trade name of UNIDINE DS-101 and 102).

Examples of the cationic emulsifying agent include dialkyl($C_{12}$–$C_{22}$)dimethylammonium chloride, alkyl (coconut)dimethylbenzylammonium chloride, octadecylamine acetate salt, tetradecylamine acetate salt, tallow alkylpropylenediamine acetate salt, octadecyltrimethylammonium chloride, alkyl(tallow)trimethylammonium chloride, dodecyltrimethylammonium chloride, alkyl (coconut)trimethylammonium chloride, hexadecyltrimethylammonium chloride, behenyltrimethylammonium chloride, alkyl(tallow)imidazoline quaternary salt, tetradecylmethylbenzylammonium chloride, octadecyldimethylbenzylammonium chloride, dioleyldimethylammonium chloride, polyoxyethylene dodecylmonomethylammonium chloride, polyoxyethylene alkyl($C_{12}$–$C_{22}$)benzylammonium chloride, polyoxyethylene laurylmonomethyl ammoniun chloride, 1-hydroxyethyl-2-alkyl(tallow)imidazoline quaternary salt, silicone cationic emulsifying agent having a siloxane group as a hydrophobic group and a fluorine-containing cationic emulsifying agent having a fluoroalkyl group as a hydrophobic group (manufactured by Daikin Industries Ltd., under the trade name of UNIDAINE DS-202).

Examples of the nonionic emulsifying agent include polyoxyethylene lauryl ether, polyoxyethylene tridecyl ether, polyoxyethylene cetyl ether, polyoxyethylene polyoxypropylene cetyl ether, polyoxyethylene stearyl ether, polyoxyethylene oleyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan monopalmitate, sorbitan monostearate, sorbitan monooleate, sorbitan sesquioleate, sorbitan trioleate, polyoxyethylene sorbitan monolaurate, polyoxyethylene sorbitan monopalmitate, polyoxyethylene sorbitan monostearate, polyoxyethylene sorbitan monooleate, polyoxyethylene polyoxypropylene block polymer, polyglycerin fatty acid ester, polyether modified silicone oil (manufactured by Toray Dow Corning Co., Ltd., under the trade names of SH3746, SH3748, SH3749 and SH3771), perfluoroalkyl ethylene oxide adduct (manufactured by Daikin Industries Ltd., under, the trade names of UNIDINE DS-401 and DS-403), fluoroalkyl ethylene oxide adduct (manufactured by Daikin Industries Ltd., under the trade name of UNIDINE DS-406) and perfluoroalkyl oligomer (manufactured by Daikin Industries Ltd., under the trade name of UNIDINE DS-451).

Examples of the organic solvent used in the emulsion polymerization are the same as those used in the solution polymerization.

In the polymerization, polymerization initiators and/or ionizing radiations (e.g. γ-ray) are used to initiate the polymerization. Examples of the polymerization initiator are an organic peroxide, an azo compound and persulfate.

Examples of the organic peroxide include t-butyl peroxypivalate, benzoyl peroxide, lauroyl peroxide, di-t-butyl peroxide and diisopropyl peroxy-dicarbonate. Examples of the azo compound include 2,2'-azobis-isobutyronitrile and 2,2'-azobis(2-methylbutyronitrile).

The copolymer (C) can be produced by the procedure which has hitherto been used (or almost the same procedure as that in case of the copolymer (A)).

The stainproofing agent can be obtained by mixing a liquid containing the copolymer (A), a urethane compound or urethane-containing copolymer (B) and a liquid containing the copolymer (C), which are separately prepared, and optionally adding a medium (e.g. water and an organic solvent).

The stainproofing agent of the present invention can be applied to the surface of the material to be treated by the method which has hitherto been known. There can be normally used a method of diluting the stainproofing agent with the organic solvent or water, applying the solution to the surface of the material to be treated (e.g. a carpet fabric, a carpet yarn or raw cotton) by a known method (e.g. dip coating, spray coating and foam coating). If necessary, the stainproofing agent may be applied together with a suitable crosslinking agent, followed by curing. It is also possible to add other water repellents and oil repellents, and mothproofing agents, textile softeners, antimicrobial agents, flame retardants, antistatic agents, paint fixing agents and creaseproofing agents to the stainproofing agent of the present invention and to use them in combination. In case of the dip coating, the solid content of the treatment liquid (namely, the concentration of the components (A) to (C) in the dipping liquid) may be from 0.05 to 10% by weight. In case of the spray coating, the solid content of the treatment liquid (namely, the concentration of the components (A) to (C) in the treatment liquid) may be from 0.1 to 5% by weight. A stain blocker may be used in combination. When using the stain blocker, the anionic or nonionic emulsifying agent is preferably used.

The product to be treated with the stainproofing agent of the present invention is preferably a textile, particularly a carpet. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semisynthetic fibers such as rayon and acetate; inorganic fibers such as glass fiber, carbon fiber and asbestos fiber; and a mixture of these fibers. The stainproofing agent of the present invention can be suitably used in carpets of nylon or polypropylene because of excellent resistance to a detergent solution and brushing (mechanical).

The textile may be in any form of a fiber as such, a yarn and a cloth. When the carpet is treated with the stainproofing agent of the present invention, the carpet may be formed after treating fibers or yarns with the stainproofing agent, or the formed carpet may be treated with the stainproofing agent of the present invention. Examples of the material to be treated with the stainproofing agent of the present invention include glass, paper, wood, hide, asbestos, brick, cement, metal and oxide, ceramics, plastics, coated surface and plaster in addition to textile.

PREFERRED EMBODIMENTS OF THE INVENTION

The present invention will be illustrated by the following Examples which do not limit the present invention. In the Examples, the amount is by weight unless specified otherwise.

The stainproofing agents obtained in the Examples and Comparative Examples were evaluated as follows. Each emulsion obtained in the Examples and Comparative Examples is diluted with water to prepare a liquid with a solid content of 3%, which is used as a treatment liquid. This treatment liquid is sprayed on a nylon loop-pile carpet fabric (non-backed product) so that a treating amount is 100 g/m$^2$, and the treated carpet fabric is dried with heating at 130° C. for 7 minutes. The water repellency, oil repellency and stainproofing properties before and after cleaning test are evaluated. The cleaning test method and the evaluation method of the water repellency, oil repellency and stainproofing properties shown in the Examples and Comparative Examples are as follows.

The cleaning test was conducted according to the method of JIS (Japanese Industrial Standaird)-L-1021-1979.

The water repellency is expressed by the water repellency No. (cf. the following Table 1) determined by the spray method according to JIS-L-1092.

The oil repellency is determined by dropping several drops (diameter: about 4 mm) of a test solution shown in AATCC-TM-118-1966 (Table 2) on two positions of the surface of a test cloth and observing the penetration state of the drops after 30 seconds. A maximum point of the oil repellency given by the test solution causing no penetration is taken as the oil repellency.

A carpet is stained with a dry soil having the composition shown in Table 3 according to JIS-L-1021-1979. After the excess dry soil on the surface is sucked with an electrical cleaner, the brightness of the surface is measured by a calorimeter and a staining degree is calculated from the following equation, which is taken for evaluation of dry soiling stainproof properties.

$$\text{Stainproof degree (\%)} = [(L_O - L)/L_O] \times 100$$

(wherein $L_O$: brightness before staining, L: brightness after staining)

The oil repellency in case of treating a carpet was evaluated in the same manner as in treating a normal fiber.

TABLE 1

| Water repellency No. | State |
| --- | --- |
| 100 | No wet on the surface |
| 90 | Slight wet on the surface |
| 80 | Partial wet on the surface |
| 70 | Wet on the surface |
| 50 | Wet over the whole surface |
| 0 | Complete wet on the front and back surfaces |

TABLE 2

| Oil repellency | Test solution | Surface tension (dyn/cm, 25° C.) |
| --- | --- | --- |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol (35/65 by weight) | 29.6 |
| 1 | Nujol | 31.2 |
| 0 | Inferior to 1 | — |

TABLE 3

| Component | Weight ratio (%) |
| --- | --- |
| Peat moss | 38 |
| Portland cement (JIS R 5210) | 17 |
| White clay (JIS K 8746) | 17 |
| Diatomaceous earth (JIS K 8330) | 17 |
| Carbon black (JIS K 5107) | 1.75 |
| Iron oxide (III) for ferrite (JIS K 1462) | 0.5 |
| Nujol | 8.75 |

PREPARATIVE EXAMPLE 1
(Vinyl Chloride-Containing FA/StA Copolymer Anionic Emulsion+Fluoroalkyl Group-Containing Urethane+ Blender Emulsion)

$CH_2$=$CHCOO(CH_2)_2(CF_2CF_2)_nCF_2CF_3$ (a mixture wherein a weight ratio of compounds wherein n is 3, 4 and 5 is 5:3:1) (SFA), stearyl acrylate (StA), 2-hydroxyethyl methacrylate (2EHA), diacetoneacrylamide (DAAM), 3-chloro-2-hydroxypropyl methacrylate (Topolene M), deionized water, n-laurylmercaptan (LSH) as a chain transfer agent, ammonium polyoxyethylene alkyl phenyl ether sulfate (Hitenol N-17), polyoxyethylene alkylphenyl ether (Nonion HS-220), polyoxyethylene sorbitan monolaurate (Nonion LT-221) and dipropylene glycol monomethyl ether (DPM) were mixed in the amount shown in Table 4 to prepare a mixed liquid.

This mixed liquid was heated to 60° C. and emulsified by a high-pressure homogenizer. The resulting emulsion was charged in a 1 L autoclave and dissolved oxygen was removed by substitution with nitrogen. Then, vinyl chloride (VCI) having a purity of 99% was charged in the amount shown in Table 4 and ammonium persulfate (APS) as an initiator was charged in the amount shown in Table 4. Under stirring, the copolymerization reaction was conducted at 60° C. for 8 hours.

A gas chromatography analysis revealed that at least 99% of monomers were polymerized.

348 g of 2,4-tolylene diisocyanate was dissolved in 348 g of methyl isobutyl ketone (MIBK) and the solution was purged with nitrogen, stirred and then heated to 80° C. When the temperature reached 80° C., two drops of dibutyltin laurate were added and, at the same time, dropwise addition of 2-perfluoroalkyl ethanol (260 g) was initiated and added dropwise, slowly, over 2 hours. After the completion of the dropwise addition, 260 g of ethanol was added dropwise slowly over 2 hours. After the completion of the dropwise addition, the stirring was continued at 80° C. for 2 hours. Then, MIBK was distilled off under reduced pressure to obtain 868 g of an yellow transparent viscous liquid. IR revealed that —NCO group completely disappeared, and $^1$H-NMR and $^{13}$C-NMR revealed the disappearance of —OH, the formation of an urethane linkage and the existence of a double bond.

A chemical structure of this product was as follows:

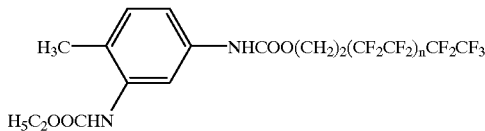

(a mixture wherein a molar ratio of compounds wherein n is 3, 4 and 5 is about 5:3:1)

100 g of this compound, 50 g of deionized water and 10 g of ethylene glycol monomethyl ether were charged, and then the temperature was raised to about 100° C. The mixture was stirred under high shear for 30 minutes and then cooled to room temperature.

The copolymer emulsion and fluoroalkyl group-containing urethane emulsion obtained by the above production process and a blender emulsion [a copolymer emulsion of methyl methacrylate (MMA)/ethyl methacrylate (EMA) (weight ratio of MMA to EMA=80:20)] were blended so that a weight ratio of each solid content of the emulsions was 1:1:1.

PREPARATIVE EXAMPLE 2
(Vinyl Chloride-Containing FA/StA Copolymer Anionic Emulsion+Urethane Linkage-Containing Monomer/FA Copolymer+Blender Emulsion)

$CH_2$=$CHCOO(CH_2)_2(CF_2CF_2)_nCF_2CF_3$ (a mixture wherein a weight ratio of compounds where in n is 3, 4 and 5 is 5:3:1) (SFA), stearyl acrylate (StA), 2-hydroxyethyl methacrylate (2EHA), diacetoneacrylamide (DAAM), 3-chloro-2-hydroxypropyl methacrylate (Topolene M), deionized water, n-laurylmercaptan (LSH), polyoxyethylene alkyl phenyl ether (Nonion HS-220), polyoxyethylene sorbitan monolaurate (Nonion LT-221) and dipropylene glycol monomethyl ether (DPM) were mixed in the amount shown in Table 4.

This mixed liquid was heated to 60° C. and emulsified by a high-pressure homogenizer. The resulting emulsion was charged in a 1 L autoclave and the dissolved oxygen was removed by substitution with nitrogen. Then, vinyl chloride (VCI) having a purity of 99% was charged in the amount shown in Table 4 and ammonium persulfate (APS) as an initiator was charged in the amount shown in Table 4. Under stirring, the copolymerization reaction was conducted at 60° C. for 8 hours.

A gas chromatography analysis revealed that at least 99% of monomers were polymerized.

348 g of 2,4-tolylene diisocyanate was dissolved in 348 g of methyl isobutyl ketone (MIBK) and the solution was purged with nitrogen, stirred and then heated to 80° C. When the temperature reached 80° C., two drops of dibutyltin laurate were added and, at the same time, dropwise addition of 2-ethylhexyl alcohol (260 g) was initiated and added dropwise, slowly, over 2 hours. After the completion of the dropwise addition, 260 g of 2-hydroxyethyl methacrylate was added dropwise, slowly, over 2 hours. After the completion of the dropwise addition, the stirring was continued at 80° C. for 2 hours. Then, MIBK was distilled off under reduced pressure to obtain 868 g of an yellow transparent viscous liquid. IR revealed that—NCO group completely disappeared, and $^1$H-NMR and $^{13}$C-NMR revealed the disappearance of —OH, the formation of an urethane linkage and the existence of a double bond.

A chemical structure of this product was as follows:

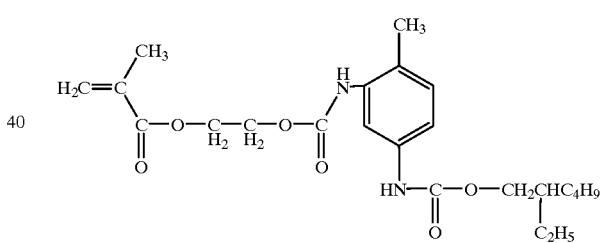

In a flask equipped with a stirrer, a thermometer and a reflux condenser, 120 g of the resulting product and 80 g of $CH_2$=$CHCOO(CH_2)_2(CF_2CF_2)_n CF_2CF_3$ (a mixture wherein a weight ratio of compounds wherein n is 3, 4 and 5 is 5:3:1) (SFA) were charged and dissolved in 800 g of MIBK. Then, the solution was stirred, purged with nitrogen and heated to 60° C. At one hour after the beginning of the purging with nitrogen, it was confirmed that the inner temperature was 60° C. 4 g of t-butyl peroxypivalate (manufactured by Nippon Yushi Co., Ltd. under the trade name of Perbutyl PV) was added to initiate the polymerization.

At eight hours after the beginning of the polymerization, a gas chromatography analysis revealed that at least 99% of monomers were reacted. A pale yellow liquid having a solid content of 20% was obtained.

Two copolymer emulsions obtained in the above production process and a blender emulsion (a copolymer emulsion of methyl methacrylate (MMA)/ethyl methacrylate (EMA) (weight ratio of MMA to EMA=80:20)) were blended so that a weight ratio of each solid content of the emulsions was 1:1:1.

Comparative Preparative Example 1
(Vinyl Chloride-Containing FA/StA Copolymer Anionic Emulsion+Blender Emulsion)

The vinyl chloride-containing FA/StA copolymer emulsion obtained in Preparative Example 1 and a blender emulsion (a copolymer emulsion of methyl methacrylate (MMA)/ethyl methacrylate (EMA)(weight ratio of MMA to EMA=80:20)) were blended so that a weight ratio of each solid content was 1:1.

Comparative Preparative Example 2
(Fluoroalkyl Group-Containing Urethane+Blender Emulsion)

The fluoroalkyl group-containing urethane obtained in Preparative Example 1 and a blender emulsion (a copolymer emulsion of methyl methacrylate (MMA)/ethyl methacrylate (EMA)(weight ratio of MMA to EMA=80:20)), were blended so that a weight ratio of each solid content was 1:1.

Comparative Preparative Example 3
(Urethane Linkage-Containing Monomer/FA Copolymer+Blender Emulsion)

The urethane linkage-containing monomer/FA copolymer emulsion obtained in Preparative Example 2 and a blender emulsion (a copolymer emulsion of methyl methacrylate (MMA)/ethyl methacrylate (EMA)(weight ratio of MMA to EMA=80:20)) were blended so that a weight ratio of each solid contend t was 1:1.

Example 1
(Vinyl Chloride-Containing FA/StA Copolymer Anionic Emulsion+Fluoroalkyl Group-Containing Urethane+Blender Emulsion)

The emulsion mixture prepared in Preparative Example 1 was diluted with water to prepare a liquid with a solid content of 3%, which was used as a treating liquid. This treating liquid was sprayed on a nylon pile carpet fabric (non-backed product) so that a treating amount was 100 g/m², and the treated carpet fabric was dried with heating at 130° C. for 7 minutes. The water repellency, oil repellency and stainproofing properties were evaluated before and after cleaning. The results are shown in Table 5.

Example 2
(Vinyl Chloride-Containing FA/StA Copolymer Anionic Emulsion+Urethane Linkage-Containing Monomer/FA Copolymer+Blender Emulsion)

The water repellency, oil repellency and stainproofing properties before and after cleaning of the emulsion mixture prepared in Preparative Example 2 were evaluated in the same manner as in Example 1. The results are shown in Table 5.

Comparative Example 1
(Vinyl Chloride-Containing FA/StA Copolymer Anionic Emulsion+Blender Emulsion)

The water repellency, oil repellency and stainproofing properties before and after cleaning of the emulsion prepared in Comparative Preparative Example 1 were evaluated in the same manner as in Example 1. The results are shown in Table 5.

Comparative Example 2
(Fluoroalkyl Group-Containing Urethane Emulsion+Blender Emulsion)

The water repellency, oil repellency and stainproofing properties before and after cleaning of the emulsion prepared in Comparative Preparative Example 2 were evaluated in the same manner as in Example 1. The results are shown in Table 5.

Comparative Example 3
(Urethane Linkage-Containing Monomer/FA Copolymer+Blender Emulsion)

The water repellency, oil repellency and stainproofing properties before and after cleaning of the emulsion prepared in Comparative Preparative Example 3 were evaluated in the same manner as in Example 1. The results are shown in Table 5.

Comparative Example 4
(Blender Emulsion)

The blender emulsion (copolymer emulsion of methyl methacrylate (MMA)/ethyl methacrylate (EMA) (weight ratio of MMA to EMA=80:20)) was diluted with water to prepare a liquid with a solid content of 3%, which was used as a treating liquid. The water repellency, oil repellency and stainproofing properties before and after cleaning of this treating liquid emulsion were evaluated in the same manner as in Example 1. The results are shown in Table 5.

TABLE 4

|  | Preparative Example 1 | Preparative Example 2 | Comparative Preparative Example 1 |
|---|---|---|---|
| Monomer composition (wt %) | | | |
| SFA | 134 | 134 | 134 |
| StA | 37 | 37 | 37 |
| VCl | 28 | 28 | 28 |
| 2EHA | 3.5 | 3.5 | 3.5 |
| DAAM | 1.8 | 1.8 | 1.8 |
| Topolene M | 1.8 | 1.8 | 1.8 |
| Emulsifying agent (based on monomer (% by weight)) | | | |
| Hitenol N-17 | 3.3 | 3.3 | 3.3 |
| HS-220 | 7.9 | 7.9 | 7.9 |
| LT-221 | 5.3 | 5.3 | 5.3 |
| Other (based on monomer (% by weight)) | | | |
| LSH | 3.5 | 3.5 | 3.5 |
| DPM | 44 | 44 | 44 |
| APS | 1.2 | 1.2 | 1.2 |
| Deionized water | 330 | 330 | 330 |

TABLE 5

|  | Example 1 | Example 2 | Comparative Example 1 | Comparative Example 2 | Comparative Example 3 | Comparative Example 4 |
|---|---|---|---|---|---|---|
| Before cleaning | | | | | | |
| Oil repellency | 5 | 5 | 4 | 4 | 0 | |

TABLE 5-continued

|  | Example 1 | Example 2 | Comparative Example 1 | Comparative Example 2 | Comparative Example 3 | Comparative Example 4 |
|---|---|---|---|---|---|---|
| Water repellency | 60 | 60 | 60 | 60 | 60 | 0 |
| Dry soil stainproof properties | 18 | 18 | 18 | 18 | 18 | 18 |
| After cleaning |  |  |  |  |  |  |
| Oil repellency | 5 | 5 | 4 | 2 | 2 | 0 |
| Water repellency | 60 | 60 | 60 | 20 | 20 | 0 |
| Dry soil stainproof properties | 18 | 18 | 18 | 36 | 36 | 25 |

What is claimed is:

1. A stainproofing agent comprising:
   (A) a fluoroalkyl group-containing copolymer comprising
      (I) a structure unit derived from a monomer having a fluoroalkyl group,
      (II) a structure unit derived from a vinyl monomer containing no fluorine which is selected from the group consisting of ethylene, vinyl acetate, vinylidene halide, acrylonitrile, styrene, alkyl (meth)acrylate, polyethylene glycol (meth)acrylate, polypropylene glycol (meth)acrylate, methoxypolyethylene glycol (meth)acrylate, methoxypolypropylene glycol (meth)acrylate, vinyl alkyl ether and isoprene,
      (III) a structure unit derived from vinyl chloride, and
      (IV) a structure unit derived from a crosslinking monomer;
   (B) a urethane compound having a fluoroalkyl group, or a copolymer having
      (V) a structure unit derived from a monomer having a fluoroalkyl group and a carbon-carbon double bond, and
      (VI) a structure unit derived from a monomer which contains no fluorine atom and has at least one urethane or urea linkage and one carbon-carbon double bond; and
   (C) an acrylic copolymer containing no fluorine.

2. The stainproofing agent according to claim 1, wherein the monomer used to derive the structure unit (I) is represented by the general formula:

$$Rf-R^1-OCOC(R^2)=CH_2$$

wherein Rf is a linear or branched fluoroalkyl group having 3 to 20 carbon atoms;
$R^1$ is a linear or branched alkylene group having 1 to 20 carbon atoms, a group of $-SO_2N(R^3)R^4-$ or a group of $-CH_2CH(OR^5)CH_2-$, wherein $R^3$ is an alkyl group having 1 to 10 carbon atoms; $R^4$ is a linear or branched alkylene group having 1 to 10 carbon atoms; and $R^5$ is a hydrogen atom or an acyl group having 1 to 10 carbon atoms; and
$R^2$ is a hydrogen atom or a methyl group.

3. The stainproofing agent according to claim 1, wherein the monomer used to derive the structure unit (II) is acrylate represented by the general formula:

$$CH_2=CB^1COOB^2$$

wherein $B^1$ is a hydrogen atom or a methyl group; and $B^2$ is an alkyl group represented by $C_nH_{2n+1}$, wherein n=1–30.

4. The stainproofing agent according to claim 1, wherein the urethane compound (B) having a fluoroalkyl group is a urethane compound represented by the general formula:

$$Rf^1-X^1-A^1-CONH-Y^1-NHCO-A^2-Z$$

wherein $Rf^1$ is a fluoroalkyl group having 4 to 16 carbon atoms; $X^1$ is $-R^1-$, $-CON(R^2)-Q^1-$ or $-SO_2N(R^2)-Q^1-$, wherein $R^1$ is an alkylene group; $R^2$ is a hydrogen atom or a lower alkyl group; and $Q^1$ is an alkylene group; $A^1$ and $A^2$ are respectively $-O-$, $-S-$ or $-N(R^2)-$, wherein $R^2$ is a hydrogen atom or a lower alkyl group; $Y^1$ is a residue wherein isocyanate is removed from an aromatic or alicyclic diisocyanate; and Z is an alkyl group, an aryl group or $-X^1-Rf^1$, or a urethane compound represented by the general formula:

$$Rf^2-X^2-A^3-CONH-Y^2-NHCO-W$$

wherein $Rf^2$ is a fluoroalkyl group having 4 to 16 carbon atoms and $X^2$ is $-R^1-$, $-CON(R^2)-Q^1-$ or $-SO_2N(R^2)-Q^1-$, wherein $R^1$ is an alkylene group, $R^2$ is a hydrogen atom or a lower alkyl group; and $Q^1$ is an alkylene group; $A^3$ is $-O-$, $-S-$ or $-N(R^3)-$, wherein $R^3$ is a hydrogen atom or a lower alkyl group; $Y^2$ is a residue wherein isocyanate is removed from an aromatic or alicyclic diisocyanate; and W is a hydrophilic group.

5. The stainproofing agent according to claim 1, wherein the monomer used to derive the structure unit (VI) is a monomer obtained by reacting:
   (a) a compound having at least two isocyanate groups,
   (b) a compound having one carbon-carbon double bond and at least one hydroxyl or amino group, and
   (c) a compound having one hydroxyl or amino group.

6. The stainproofing agent according to claim 1, wherein the copolymer (C) is derived from at least two (meth)acrylic monomers containing no fluorine, and the (meth)acrylic monomer containing no fluorine is represented by the general formula:

$$CH_2=CX^1COOX^2$$

wherein $X^1$ is a hydrogen atom or a methyl group; and $X^2$ is a linear or branched $C_nH_{2n+1}$ (n=1–5).

7. The stainproofing agent according to claim 1, wherein the amount of the structure unit (I) is from 40 to 90% by weight, the amount of the structure unit (II) is from 5 to 60% by weight, the amount of the structure unit (III) is from 5 to 50% by weight, and the amount of the structure unit (IV) is from 0.1 to 10% by weight, respectively, based on the copolymer (A).

8. The stainproofing agent according to claim 1, wherein the copolymer (A), the urethane compound or urethane-containing copolymer (B) and the copolymer (C) are in the form of an aqueous dispersion in a medium comprising water.

9. The stainproofing agent according to claim 1, wherein the copolymer (A), the urethane compound or urethane-containing the copolymer (B) and the copolymer (C) are in the form of an aqueous dispersion in a medium comprising water, using nonionic and/or anionic emulsifying agents.

10. A stainproofing agent comprising:
(B) a copolymer having:
(V) a structure unit derived from a monomer having a fluoroalkyl group and carbon-carbon double bond, and
(VI) a structure unit derived from a monomer which contains no fluorine atom and has at least one urethane or urea linkage and one carbon-carbon double bond; and
(C) an acrylic copolymer containing no fluorine.

11. The stainproofing agent according to claim 1, wherein urethane-containing copolymer (B) and the copolymer (C) are in the form of an aqueous dispersion prepared by dispersing in a medium comprising water.

12. A textile product which comprises a textile substrate treated with the stainproofing agent according to claim 1.

13. The textile product according to claim 12, wherein the textile substrate is a carpet.

14. The stainproofing agent according to claim 1, wherein the alkyl group of structure unit (II) has 1 to 30 carbon atoms.

15. The stainproofing agent according to claim 1, wherein the crosslinking monomer of structure unit (IV) is selected from the group consisting of diacetone acrylamide, (meth)acrylamide, N-methylol acrylamide, hydroxymethyl (meth)acrylate, hydroxyethyl (meth)acrylate, 3-chloro-2-hydroxypropyl (meth)acrylate, N,N-dimethylaminoethyl (meth)acrylate, N,N-diethylaminoethyl (meth)acrylate, butadiene, chloroprene, glycidyl (meth)acrylate, 2-methacryloyloxyethyl succinate, acrylate and methacrylate.

16. The stainproofing agent according to claim 1, wherein the weight-average molecular weight of the copolymer (A) is from 2,000 to 1,000,000; and wherein the structure unit (I) is present in an amount of 50 to 80% by weight, the structure unit (II) is present in an amount of 10 to 40% by weight, the structure unit (III) is present in an amount of 5 to 50% by weight, and the structure unit (IV) is present in an amount of 0.5 to 5% by weight.

17. The stainproofing agent according to claim 4, wherein the alkylene group of $R^1$ and $Q^1$ is a $C_1$–$C_{20}$ alkylene group; the lower alkyl group of $R^2$ and $R^3$ is a $C_1$–$C_{10}$ alkyl group; and the alkyl group of Z is a $C_1$–$C_{10}$ alkyl group.

18. The stainproofing agent according to claim 4, wherein (B) is the urethane compound having a fluoroalkyl group.

19. The stainproofing agent according to claim 18, wherein the alkylene group of $R^1$ and $Q^1$ is a $C_1$–$C_{20}$ alkylene group; the lower alkyl group of $R^2$ and $R^3$ is a $C_1$–$C_{10}$ alkyl group; and the alkyl group of Z is a $C_1$–$C_{10}$ alkyl group.

20. The stainproofing agent according to claim 1, wherein the monomer constituting the structure unit (V) is represented by the general formula:

$$Rf-R^1-OCOC(R^2)=CH_2$$

wherein Rf is a linear or branched fluoroalkyl group having 3 to 20 carbon atoms;
$R^1$ is a linear or branched alkylene group having 1 to 20 carbon atoms, a group of —$SO_2N(R^3)R^4$— or a group of —$CH_2CH(OR^5)CH_2$—, wherein $R^3$ is an alkyl group having 1 to 10 carbon atoms; $R^4$ is a linear or branched alkylene group having 1 to 10 carbon atoms; and $R^5$ is a hydrogen atom or an acyl group having 1 to 10 carbon atoms; and $R^2$ is a hydrogen atom or a methyl group.

21. The stainproofing agent according to claim 5, wherein (B) is a copolymer having structure units (V) and (VI), and wherein the monomer constituting the structure unit (V) is represented by the general formula:

$$Rf-R^1-OCOC(R^2)=CH_2$$

wherein Rf is a linear or branched fluoroalkyl group having 3 to 20 carbon atoms;
$R^1$ is a linear or branched alkylene group having 1 to 20 carbon atoms, a group of —$SO_2N(R^3)R^4$— or a group of —$CH_2CH(OR^5)CH_2$—, wherein $R^3$ is an alkyl group having 1 to 10 carbon atoms; $R^4$ is a linear or branched alkylene group having 1 to 10 carbon atoms; and $R^5$ is a hydrogen atom or an acyl group having 1 to 10 carbon atoms; and $R^2$ is a hydrogen atom or a methyl group.

22. The stainproofing agent according to claim 1, wherein structure units (I) and (V) are represented by the general formula:

$$Rf-R^1-OCOC(R^2)=CH_2$$

wherein Rf is a linear or branched fluoroalkyl group having 3 to 20 carbon atoms;
$R^1$ is a linear or branched alkylene group having 1 to 20 carbon atoms, a group of —$SO_2N(R^3)R^4$— or a group of —$CH_2CH(OR^5)CH_2$—, wherein $R^3$ is an alkyl group having 1 to 10 carbon atoms; $R^4$ is a linear or branched alkylene group having 1 to 10 carbon atoms; and $R^5$ is a hydrogen atom or an acyl group having 1 to 10 carbon atoms; and $R^2$ is a hydrogen atom or a methyl group;

the alkyl group of structure unit (II) has 1 to 30 carbon atoms;

the crosslinking monomer of structure unit (IV) is selected from the group consisting of diacetone acrylamide, (meth)acrylamide, N-methylol acrylamide, hydroxymethyl (meth)acrylate, hydroxyethyl (meth)acrylate, 3-chloro-2-hydroxypropyl (meth)acrylate, N,N-dimethylaminoethyl (meth)acrylate, N,N-diethylaminoethyl (meth)acrylate, butadiene, chloroprene, glycidyl (meth)acrylate, 2-methacryloyloxyethyl succinate, acrylate and methacrylate; and the copolymer (C) is derived from at least two (meth)acrylic monomers containing no fluorine, and the (meth)acrylic monomer containing no fluorine is represented by the general formula:

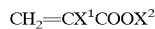

$$CH_2=CX^1COOX^2$$

wherein $X^1$ is a hydrogen atom or a methyl group; and $X^2$ is a linear or branched $C_nH_{2n+1}$, wherein n=1–5.

23. The stainproofing agent according to claim 10, wherein structure unit (V) is represented by the general formula

$$Rf-R^1-OCOC(R^2)=CH_2$$

wherein Rf is a linear or branched fluoroalkyl group having 3 to 20 carbon atoms;
$R^1$ is a linear or branched alkylene group having 1 to 20 carbon atoms, a group of —$SO_2N(R^3)R^4$— or a group of —$CH_2CH(OR^5)CH_2$—, wherein $R^3$ is an alkyl group having 1 to 10 carbon atoms; $R^4$ is a linear or branched alkylene group having 1 to 10 carbon atoms; and $R^5$ is a hydrogen atom or an acyl group having 1 to 10 carbon atoms; and $R^2$ is a hydrogen atom or a methyl group; and the monomer used to derive the structure unit (VI) is a monomer obtained by reacting:
(a) a compound having at least two isocyanate groups,
(b) a compound having one carbon-carbon double bond and at least one hydroxyl or amino group, and
(c) a compound having one hydroxyl or amino group.

24. The stainproofing agent according to claim 1, wherein (B) is a copolymer of structure unit (V) and (VI), the weight ratio of (V) to (VI) is 5:95 to 95:5, and the weight-average molecular weight of copolymer (B) is 500 to 1,000,000.

25. The stainproofing agent according to claim 24, wherein the weight ratio of (V) to (VI) is 20:80 to 95:5.

26. The stainproofing agent according to claim 1, wherein copolymer (C) has a weight-average molecular weight of from 1,000 to 1,000,000.

27. The stainproofing agent according to claim 1, where in copolymer (C) has a weight-average molecular weight of from 100,000 to 200,000.

* * * * *